(12) United States Patent
Yoshioka

(10) Patent No.: US 6,721,553 B2
(45) Date of Patent: Apr. 13, 2004

(54) EMERGENCY ALARM TERMINAL AND EMERGENCY ALARM SYSTEM

(75) Inventor: Kenji Yoshioka, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/936,502

(22) PCT Filed: Jan. 11, 2001

(86) PCT No.: PCT/JP01/00096
§ 371 (c)(1),
(2), (4) Date: Jan. 10, 2002

(87) PCT Pub. No.: WO01/52216
PCT Pub. Date: Jul. 19, 2001

(65) Prior Publication Data

US 2002/0160746 A1 Oct. 31, 2002

(30) Foreign Application Priority Data

Jan. 14, 2000 (JP) ............................................ 2000-6517

(51) Int. Cl.[7] ............................................. H04M 11/04
(52) U.S. Cl. ...................... 455/404.1; 455/572; 455/521
(58) Field of Search ............................... 455/404.1, 572, 455/550, 556, 456.5, 521

(56) References Cited

U.S. PATENT DOCUMENTS 4,359,679 A * 11/1982 Regan ......................... 323/272
5,223,844 A * 6/1993 Mansell et al. ........ 342/357.07
5,890,061 A * 3/1999 Timm et al. .............. 455/404.2
6,397,088 B1 * 5/2002 Roo ............................ 455/572

FOREIGN PATENT DOCUMENTS

| JP | 11-272968 | 10/1999 | |
| JP | 11-283159 | 10/1999 | |
| JP | 11-341193 | 12/1999 | |
| JP | 11341193 A | * 12/1999 | .......... H04M/11/04 |

* cited by examiner

Primary Examiner—William Trost
Assistant Examiner—Sharad Rampuria
(74) Attorney, Agent, or Firm—Pearne & Gordon LLP

(57) ABSTRACT

The invention provides an emergency communication system terminal apparatus and an emergency communication system which can maintain the operation of the emergency communication system terminal apparatus by the supply of power from an auxiliary battery and can continue the supply of power to a microphone module also in the case in which power supply from a main battery is interrupted.

More specifically, in the invention, emergency message communicating means (11) carries out a process for receiving a transmission voice signal from a hands-free device (19) and transmitting the transmission voice signal to a center for controlling an emergency communication system such as an emergency communication center. A power controller (17) carries out a process for generating power to be supplied to a microphone module (6) from power supplied from a main battery (5) when the power is being supplied from the main battery (5). Moreover, the power controller (17) switches power supply from an auxiliary battery (18) in place of the main battery (5) when the power supply from the main battery (5) is interrupted.

7 Claims, 7 Drawing Sheets

EMERGENCY ALARM TERMINAL AND EMERGENCY ALARM SYSTEM

TECHNICAL FIELD

The present invention relates to an emergency communication system terminal apparatus and an emergency communication system which are mounted on a vehicle and serve to transmit data such as positional information of the vehicle to a center in case of emergency. And more particularly, even if the supply of power from a main battery is interrupted due to traffic accidents or failures, the emergency communication system terminal apparatus and an emergency communication system can maintain the operation of the emergency communication system terminal apparatus by the supply of power from an auxiliary battery and can continue the supply of power to a microphone module.

BACKGROUND ART

Conventionally, there has been known an emergency communication system terminal apparatus comprising emergency message communicating means which is mounted on a vehicle such as an automobile and serves to carry out a telephone originating process through the base station of a communication service provider to a center for managing an emergency communication system such as a police or an emergency communication center.

The conventional emergency communication system terminal apparatus depends on only the supply of power from a main battery provided in a vehicle. Also in the supply of power to a microphone module, therefore, the supply of power from the main battery is used to generate power.

In the conventional emergency communication system terminal apparatus, however, an auxiliary battery is not mounted. Therefore, there has been a problem in that hands-free voice talking cannot be carried out during an emergency message communicating process because the supply of power to the microphone module is interrupted when the supply of power from the main battery provided in the vehicle is interrupted.

It is supposed that an operator cannot move his (her) body freely and brings a receiver close to ears with difficulty when accidents occur. For this reason, hands-free talking is indispensable.

Therefore, the invention has an object to provide an emergency communication system terminal apparatus and an emergency communication system which can maintain the operation of the emergency communication system terminal apparatus by the supply of power from an auxiliary battery and can continue the supply of power to a microphone module also even if the supply of power from a main battery is interrupted.

DISCLOSURE OF THE INVENTION

In order to solve the problem, the present invention provides an emergency communication system terminal apparatus comprising means for implementing hands-free voice talking when giving an emergency communication by inputting a voice signal from a microphone module, means for generating power to be supplied to the microphone module through power supplied from a main battery provided in a vehicle, and means for switching power supply to the microphone module to generation from power supplied from an auxiliary battery when power supply is interrupted by a failure of the main battery.

With such a structure, in the case that the supply of power is interrupted by the failure of the main battery provided in the vehicle, an operation is maintained by the supply of power from the auxiliary battery and power is generated by the supply of power to the auxiliary battery also in the supply of power to the microphone module. Consequently, it is possible to maintain information transmission through voice talking.

Moreover, each of a source voltage to be supplied to a microphone provided in the microphone module and a reference signal voltage is generated by a separate voltage reducing circuit.

With such a structure, also in the case in which the supply of power from the main battery is interrupted, a voice talking operation can be continued, and tone quality can be prevented from being deteriorated by inhibiting the reference signal voltage from being influenced by a fluctuation in power supply relative to a voice to be input to the microphone in order to separate the power supply to the microphone from a voice reference signal voltage.

Furthermore, conductors dedicated to power supply from the emergency communication system terminal apparatus to the microphone module and a power GND are provided and other conductors are further provided for a microphone voice signal and a microphone voice signal GND.

With such a structure, also in the case in which the supply of power from the main battery is interrupted, the voice talking operation can be continued and the voice signal can be input differentially in the emergency communication system terminal apparatus. Consequently, a noise interference is caused with difficulty and tone quality can be prevented from being deteriorated.

Moreover, a conductor dedicated to power supply from the emergency communication system terminal apparatus to the microphone module is provided, a vehicle housing is used for a power GND, and other conductors are further provided for a microphone voice signal and a microphone voice signal GND.

With such a structure, also in the case in which the supply of power from the main battery is interrupted, the voice talking operation can be continued. In addition, it is possible to reduce the conductors between the microphone nodule and the emergency communication system terminal apparatus by sharing the power GND and the GND of the vehicle.

Furthermore, conductors dedicated to power supply from the emergency communication system terminal apparatus to the microphone module and a microphone voice signal are provided, and a common conductor is provided for a power GND and a microphone voice signal GND.

With such a structure, also in the case in which the supply of power from the main battery is interrupted, the voice talking operation can be continued. In addition, it is possible to reduce the conductors between the microphone module and the emergency communication system terminal apparatus by sharing the power GND and the GND of the microphone module.

Moreover, conductors dedicated to power supply from the emergency communication system terminal apparatus to the microphone module and a power GND are provided, and a voice signal is synthesized and transmitted to the power GND.

With such a structure, also in the case in which the supply of power from the main battery is interrupted, the voice talking operation can be continued and a power supply path and a microphone voice transmitting path can be shared. Therefore, the conductors can further be reduced.

Figure 1:
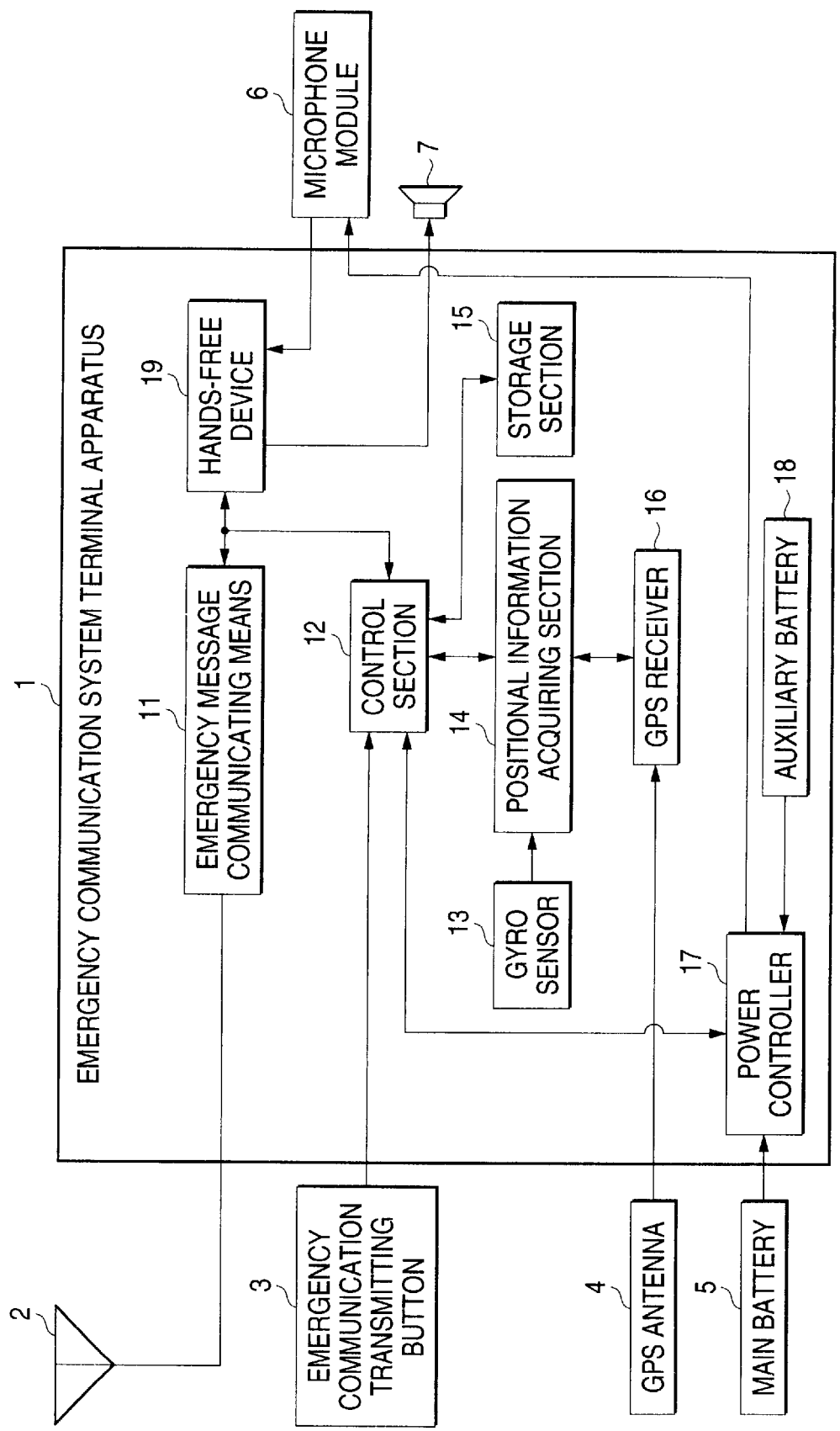
FIG. 1 is a block diagram showing the structure of an emergency communication system terminal apparatus according to a first embodiment of the invention.

In the drawings, the reference numeral 1 denotes an emergency communication system terminal apparatus, the reference numeral 2 denotes a communication antenna, the reference numeral 3 denotes an emergency communication transmitting button, the reference numeral 4 denotes a GPS antenna, the reference numeral 5 denotes a main battery, the reference numeral 6 denotes a microphone module, the reference numeral 7 denotes a speaker, the reference numeral 11 denotes emergency message communicating means, the reference numeral 12 denotes a control section, the reference numeral 13 denotes a gyro sensor, the reference numeral 14 denotes a positional information acquiring section, the reference numeral 15 denotes a storage section, the reference numeral 16 denotes a GPS receiver, the reference numeral 17 denotes a power controller, the reference numeral 18 denotes an auxiliary battery, the reference numeral 19 denotes a hands-free device, the reference numeral 61 denotes a microphone, the reference numeral 62 denotes a first operational amplifier, the reference numeral 63 denotes a first capacitor, the reference numeral 64 denotes a resistor R1, the reference numeral 65 denotes a resistor R2, the reference numeral 66 denotes a resistor R3, the reference numeral 67 denotes a resistor R4, the reference numeral 68 denotes a resistor R5, the reference numeral 69 denotes a resistor R6, the reference numeral 70 denotes a second capacitor, the reference numeral 101 denotes a second operational amplifier, the reference numeral 102 denotes a resistor R7, the reference numeral 103 denotes a resistor R8, the reference numeral 104 denotes a resistor R9, the reference numeral 171 denotes a first diode, the reference numeral 172 denotes a second diode, the reference numeral 173 denotes a regulator, the reference numeral 174 denotes a transistor, the reference numeral 175 denotes a third diode, the reference numeral 176 denotes a transistor, the reference numeral 177 denotes a regulator, and the reference numeral 178 denotes a fourth diode.

BEST MODE FOR CARRYING OUT THE INVENTION

Embodiments of the invention will be described below with reference to FIGS. 1 to 7.

(First Embodiment)

An emergency communication system terminal apparatus according to a first embodiment of the invention comprises means for generating power to be supplied to a microphone module by power supplied from a main battery provided in a vehicle, and means for switching the power supply to the microphone module into generation by power supply from an auxiliary battery when the power supply is interrupted by the failures of the main battery.

FIG. 1 is a block diagram showing the structure of the emergency communication system terminal apparatus according to the first embodiment of the invention. In FIG. 1, an emergency communication system terminal apparatus 1 is mounted on a vehicle such as an automobile and serves to transmit data such as information about the current position of the vehicle or registered vehicle to a center for controlling an emergency communication system such as a police or an emergency communication center when emergent such as an traffic accident or a sudden illness, thereby demanding to send an emergent vehicle. The communication antenna 2 carries out a process for transmitting a signal from the emergency message communicating means 11 to the base station of a communication enterpriser and outputting a signal received from the communication enterpriser to the emergency message communicating means 11. The emergency communication transmitting button 3 is pressed down by a user in case of emergency such as traffic accidents or a sudden illness to generate a signal for starting an originating process. The GPS antenna 4 serves to receive data from a GPS satellite.

The main battery 5 serves to supply power to electrical equipment of a vehicle and to the emergency communication system terminal apparatus 1. The microphone module 6 includes a microphone for carrying out a process for outputting a user's voice to the emergency communication system terminal apparatus 1 and an amplifying circuit during the voice talking communication of an emergency massage communicating process. The speaker 7 serves to sing a voice signal received from the emergency communication center during the voice talking communication.

In the emergency communication system terminal apparatus 1, the emergency message communicating means 11 serves to start a telephone originating process for a talking party corresponding to a telephone number input from the control section 12 through the base station of a communication enterpriser for an origination request signal sent from the control section 12. In the case in which a response transmitted from the talking party or a signal to be converted into in-talking such as an in-talking signal is received, voice talking control or data communication control is started and a signal indicative of the conversion into the in-talking is output to the control section 12.

Furthermore, data such as information about the direction or way of advance of a vehicle and information about a position which are input from the control section 12 are transmitted to a center for controlling an emergency communication system such as a police or an emergency communication center to be the talking party corresponding to the telephone number through the base station of the communication service provider.

The control section 12 serves to carry out control for recording, in the storage section 15, the data such as the positional information which are acquired from the positional information acquiring section 14. Furthermore, the control section 12 recognizes that an emergency communication request is given based on an operation signal sent from the emergency communication transmitting button 3 and inputs data such as the positional information which are acquired from the positional information acquiring section 14 and are stored in the storage section 15 in order to start the emergency message communicating process.

Furthermore, the telephone number of the center for controlling the emergency communication system such as a police or an emergency communication center is acquired from the storage section 15. A request for originating a telephone is given to the emergency message communicating means 11 by using the telephone number. Furthermore, in the case in which a response signal sent from a talking party corresponding to the telephone number or a signal to be converted into in-talking such as an in-talking signal is received from the emergency message communicating means 11, it is recognized that an in-talking state is started. There is performed a process for outputting, to the emergency message communicating means 11, a signal for transmitting positional information history data acquired from the positional information acquiring section 14 through the base station of the communication enterpriser to the center for controlling the emergency communication system such as a police or an emergency communication center to be a talking party corresponding to the telephone number.

The gyro sensor 13 serves to generate information such as a direction or way of advance of a vehicle. The positional information acquiring section 14 serves to output, to the control section 12, data such as the positional information which are generated from data transmitted from the gyro sensor 13 or data received from the GPS antenna 4 by the GPS receiver 16. The storage section 15 is a memory for storing information such as the telephone number of the center for controlling the emergency communication system such as a police or an emergency communication center, the registration number of a vehicle mounting the emergency communication system terminal apparatus 1 or the positional information generated by the positional information acquiring section 14, and carries out a process for outputting the recorded data in response to a request signal sent from the control section 12.

The GPS receiver 16 is a device for carrying out a process for outputting data such as the positional information to the positional information acquiring section 14 based on data acquired from the GPS antenna 4. The power controller 17 is a device for monitoring the source voltage of the main battery 5, deciding that abnormality is caused when the voltage of the main battery 5 is dropped and carrying out switching to power supply from the auxiliary battery 18 to perform control for continuously maintaining the operation of the emergency communication system terminal apparatus 1 and to perform control for switching the power supply from the main battery 5 into the auxiliary battery 18.

The auxiliary battery 18 has the function of supplying power to the emergency communication system terminal apparatus 1 in place of the main battery 5 when the power supply from the main battery 5 is interrupted.

Description will be given to the operation of the emergency communication system terminal apparatus according to the first embodiment of the invention having the structure described above. In FIG. 1, the positional information acquiring section 14 generates positional information data from data transmitted from the gyro sensor 13 or data received from the GPS antenna 4 by the GPS receiver 16. The control section 12 carries out a process for periodically acquiring data such as positional information from the positional information acquiring section 14 and recording the data in the storage section 15.

A user presses down the emergency communication transmitting button 3 in case of emergency such as traffic accidents or a sudden illness. The emergency communication transmitting button 3 outputs, to the control section 12, a signal indicating that it is pressed down by the user. The control section 12 recognizes that the emergency communication originating request is given in response to an operation signal sent from the emergency communication transmitting button 3 and starts an emergency communication processing. The control section 12 acquires, from the storage section 15, the data such as positional information stored and the telephone number of the center for controlling the emergency communication system such as a police or an emergency communication center and gives an originating request for a telephone to the emergency message communicating means 11 by using the telephone number. The emergency message communicating means 11 starts a telephone originating process to a talking party corresponding to the telephone number through the base station of a communication enterpriser by using the communication antenna 2.

The emergency message communicating means 11 recognizes that an in-taking state is started when receiving an originating response from a talking party or a signal for conversion into in-talking such as an in-talking signal, and starts voice talking control or data communication control and outputs, to the control section 12, a signal giving a notice that the in-talking is started. The control section 12 carries out a process for deciding that the talking is successful and transmitting data such as positional information to the center for controlling the emergency communication system such as a police or an emergency communication center to be a talking party corresponding to the telephone number through the base station of a communication enterpriser.

The center for controlling the emergency communication system such as an emergency communication center carries out a process for performing switching to voice talking when receiving all the positional information data from the emergency communication system terminal apparatus 1. The emergency message communicating means 11 including the emergency communication system terminal apparatus 1 outputs, to the control section 12, a signal indicating that the voice talking is started when receiving the signal indicating that the voice talking is started. The control section 12 carries out control for connecting the emergency message communicating means 11 to a voice path for the hands-free device 19 when receiving the signal indicating that the voice talking is started, and then starts a voice talking communicating process.

During the voice talking communicating process, the emergency message communicating means 11 outputs a voice signal received from the center for controlling the emergency communication system such as the emergency communication center to the hands-free device 19. The hands-free device 19 carries out an echo cancel process or howling prevention control for the received voice signal, and furthermore, amplifies a signal level and outputs the signal to the speaker 7. The speaker 7 carries out a process for singing the received voice signal input from the hands-free device 19 and transmits the signal to the user.

The microphone module 6 acquires the voice signal from the user, and furthermore, carries out an amplifying process and outputs a transmitted voice signal to the hands-free device 19. The hands-free device 19 carries out the echo cancel process or the howling prevention control for the transmitted voice signal and outputs the processed signal to the emergency message communicating means 11. The emergency message communicating means 11 carries out a process for receiving the voice signal transmitted from the hands-free device 19 and transmitting the same signal to the center for controlling the emergency communication system such as an emergency communication center.

Moreover, the power controller 17 supplies operation power to the microphone module 6. The power controller 17 carries out a process for generating power to be supplied to the microphone module 6 from power supplied from the main battery 5 when the power is supplied from the main battery 5. The power controller 17 carries out switching into the power supply from the auxiliary battery 18 in place of the main battery 5 when the power supply from the main battery 5 is interrupted.

In the first embodiment of the invention, as described above, the operation can be maintained by the power supplied from the auxiliary battery 18 in place of the main battery 5 when the power supply from the main battery 5 provided in the vehicle is interrupted by failures or traffic accidents in the transmission of information through the voice talking of the emergency message communicating process, and the power supply to the microphone module 6 can be continued by generating the power to be supplied to the microphone module 6 from the power supplied from the auxiliary battery 18. Therefore, it is possible to continue the input of the voice signal transmitted from the microphone module 6 and to maintain the information transmission through the voice talking communicating process.

Next, the power supply to the microphone module 6 will be described based on a specific example of the control for switching from the main battery 5 into the auxiliary battery 18.

Figure 2:
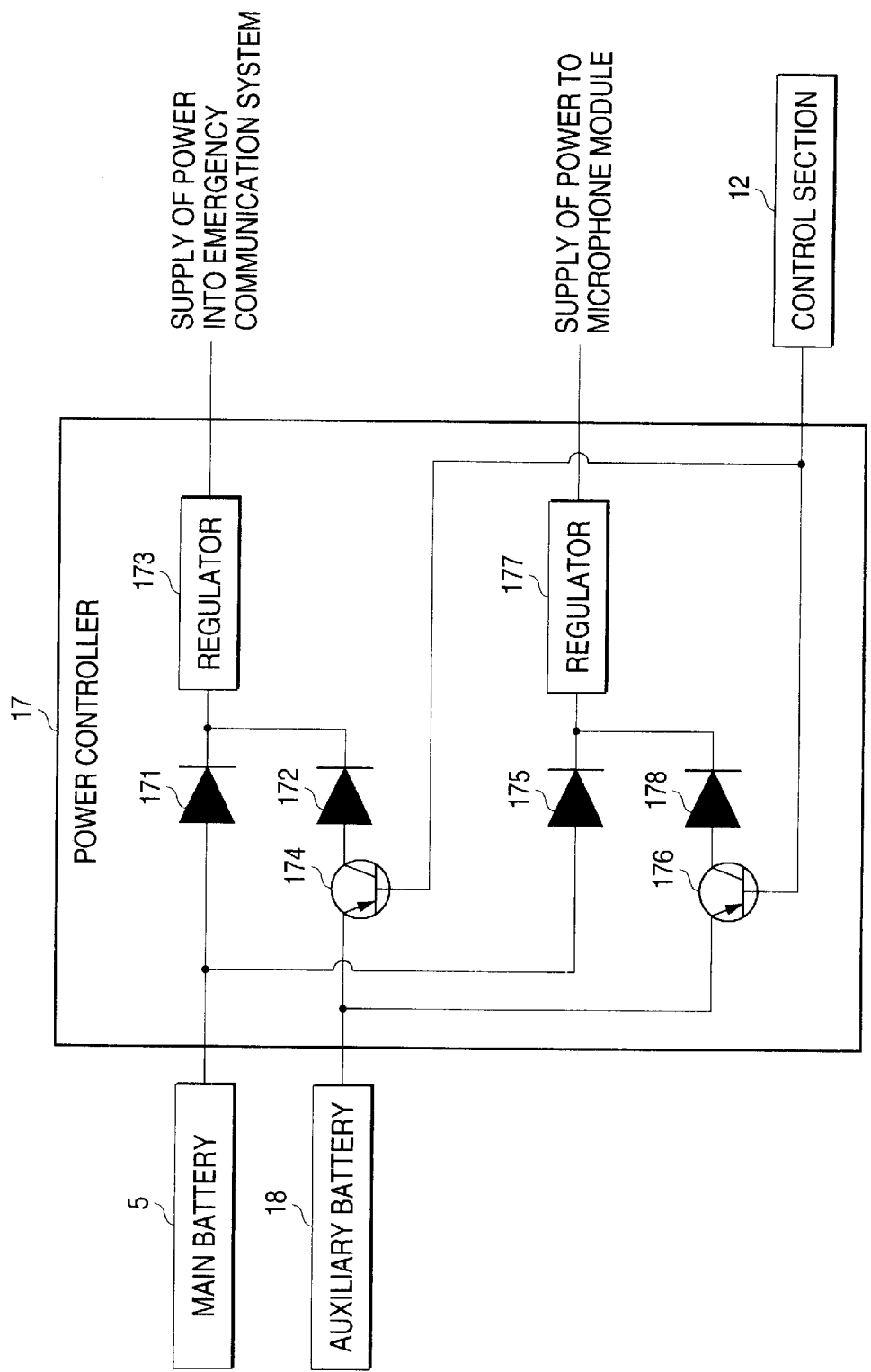
FIG. 2 is a block diagram showing the internal structure of a power controller 17 according to the first embodiment of the invention.

FIG. 2 is a block diagram showing the internal structure of the power controller 17.

In FIG. 2, the first diode 171 and the third diode 175 serve to prevent the reverse flow of power supplied from the main battery 5. The second diode 172 and the fourth diode 178 serve to prevent the reverse flow of the power supplied from the auxiliary battery 18. The regulator 173 serves to generate the power to be supplied into the emergency communication system terminal apparatus 1 and the regulator 177 serves to generate the power to be supplied to the microphone module. The transistors 174 and 176 serve to carry out ON/OFF control of the power supplied from the auxiliary battery 18 and the ON/OFF control is executed in response to a signal sent from the control section 12.

The power controller 17 controls the transistors 174 and 176 to be turned OFF in response to a control signal sent from the control section 12 if the power supplied from the main battery 5 is normal, and generates power supply into the emergency communication system terminal apparatus 1 and power to be supplied to the microphone module 6 from the power supplied from the main battery 5. In the case that the power supply from the main battery 5 is interrupted by failures or traffic accidents, the control section 12 outputs a control signal for turning ON the transistor 174 and a control signal for turning ON the transistor 176.

The auxiliary battery 18 supplies power to the power controller 17 by the ON control of the transistors 174 and 176. The power controller 17 generates power to be supplied into the emergency communication system terminal apparatus 1 from the power supplied from the auxiliary battery 18. Furthermore, the power controller 17 generates power to be supplied to the microphone module 6 from the power supplied from the auxiliary battery 18.

In the first embodiment of the invention, as described above, there are provided means for generating the power to be supplied to the microphone module 6 from the power supplied from the main battery 5 provided in the vehicle, and means for generating the power to be supplied to the microphone module 6 from the power supplied from the auxiliary battery 18 when the power supply is interrupted by the failures of the main battery 5. In the case in which the power supply is interrupted by the failures of the main battery 5 provided in the vehicle, therefore, the operation can be maintained by the power supplied from the auxiliary battery 18 and the power to be supplied to the microphone module 6 is also generated from the power supplied from the auxiliary battery 18. Consequently, it is possible to maintain the information transmission through voice talking.

(Second Embodiment)

In a second embodiment of the invention, there is provided a microphone module for generating, through individual voltage reducing circuits, a source voltage to be supplied to a microphone provided in the microphone module and a reference signal voltage.

Figure 3:
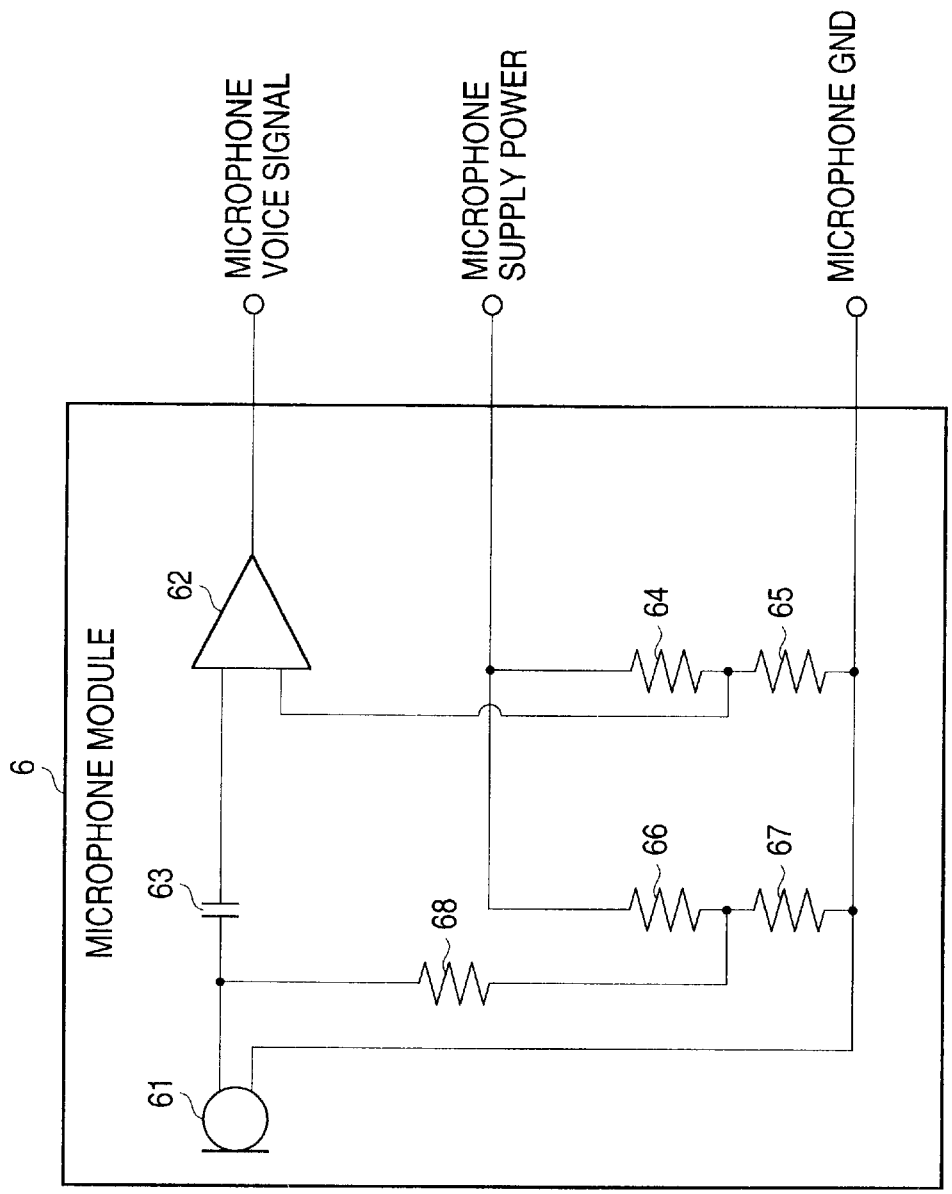
FIG. 3 is a block diagram showing the structure of a microphone module of an emergency communication system terminal apparatus according to a second embodiment of the invention.

FIG. 3 is a block diagram showing the structure of the microphone module of an emergency communication system terminal apparatus according to the second embodiment of the invention.

In FIG. 3, a microphone module 6 is the same as the microphone module 6 shown in FIG. 1.

In the microphone module 6, a microphone 61 serves to acquire a voice signal of a user. A first operational amplifier 62 serves to amplify the voice signal generated by the microphone 61 and to output the voice signal to the emergency communication system terminal apparatus 1. A first capacitor 63 serves to remove a DC voltage component of the voice signal Sent from the microphone 61. Resistors R1 (64) and R2 (65) serve to carry out a voltage reducing process through power supplied from the emergency communication system terminal apparatus 1 and to generate a reference voice signal voltage of the first operational amplifier 62. Resistors R3 (66) and R4 (67) serve to carry out a voltage reducing process through the power supplied from the emergency communication system terminal apparatus 1 and to generate a source voltage to be supplied to the microphone 61. A resistor R5 (68) is connected between the power supply and the microphone 61.

The source voltage supplied from the emergency communication system terminal apparatus 1 is reduced by the resistors R3 (66) and R4 (67) and is input to the microphone 61 through a resistor R5 (68). By the supplied source voltage, the microphone 61 generates a voice signal through the user's voice. The DC component of the voice signal is removed through the first capacitor 63 and the voice signal is input to the first operational amplifier 62. Moreover, the source voltage supplied from the emergency communication system terminal apparatus 1 is reduced by the resistors R1 (64) and R2 (65), and is input as a reference voice signal voltage to the first operational amplifier 62. The first operational amplifier 62 generates the voice signal sent from the microphone 61 as a voice signal having the reference voice signal voltage to be a reference voltage, and furthermore, carries out an amplifying process and outputs the voice signal to the emergency communication system terminal apparatus 1.

In the second embodiment of the present invention, as described above, the source voltage to be supplied to the microphone 61 and the reference voice signal voltage are generated by the individual voltage reducing circuits. Therefore, the source voltage to be supplied to the microphone 61 can be separated frog the reference voice signal voltage so that it is possible to prevent an AC component from being applied due to a fluctuation in the reference voice signal voltage for a fluctuation in a signal relative to the voice input to the microphone 61. By preventing a noise component changed into the voice signal sent from the microphone 61 from being applied to an output sent from the first operational amplifier 62, consequently, tone quality can be inhibited from being deteriorated.

(Third Embodiment)

A third embodiment of the invention provides such a structure that conductors dedicated to power supply and a power GND are provided, and furthermore, separate conductors for a microphone voice signal and a microphone signal GND are provided in the emergency communication system terminal apparatus and an interface of a microphone module.

Figure 4:
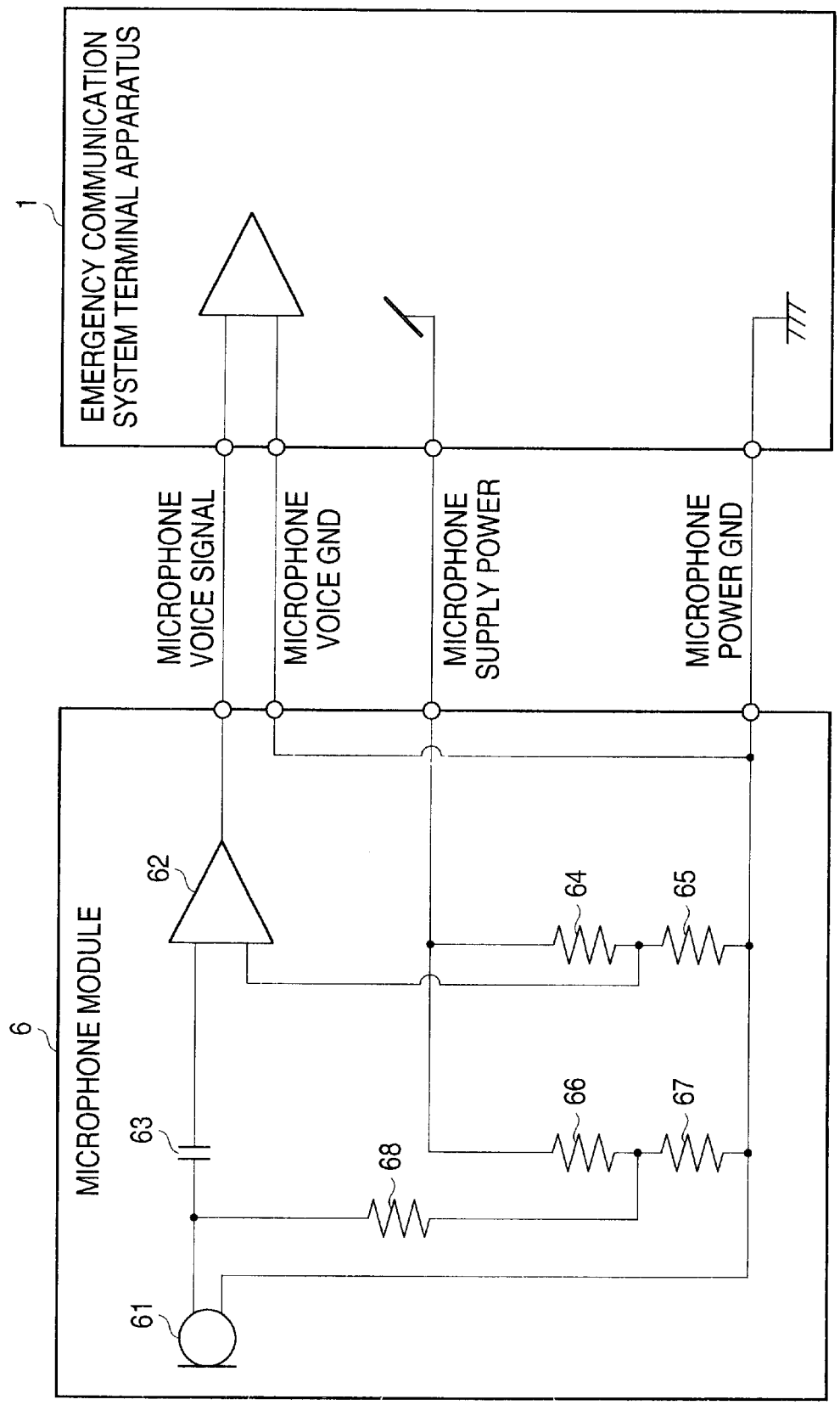
FIG. 4 is a block diagram showing the structure of a microphone module of an emergency communication system terminal apparatus according to a third embodiment of the invention.

FIG. 4 is a block diagram showing the structures of an emergency communication system terminal apparatus and a microphone module according to the third embodiment of the invention.

In FIG. 4, a microphone module 6 is the same as the microphone module 6 shown in FIG. 3 and is different from the microphone module of FIG. 3 in that a microphone voice signal GND and a power GND are input through separate systems in the emergency communication system terminal apparatus 1.

The microphone signal GND and the power GND connected to the microphone module 6 are provided independently so that the emergency communication system terminal apparatus 1 can input a voice signal differentially. In this case, the microphone voice signal and the microphone signal GND are wired through a coaxial line. Also in the case in which a noise is applied to the wiring, consequently, the same noise can be applied to both the microphone voice signal and the microphone signal GND. Therefore, the noise can be removed by differentially inputting the microphone voice signal and the microphone signal GND in the emergency communication system terminal apparatus 1.

In the third embodiment of the invention, as described above, the voice signal can be input differentially in the emergency communication system terminal apparatus 1. Consequently, the interference of a noise is suffered with difficulty and tone quality can be prevented from being deteriorated.

(Fourth Embodiment)

A fourth embodiment of the invention provides such a structure that a conductor dedicated to power supply from the emergency communication system terminal apparatus to a microphone module is provided, a vehicle housing is used for a power GND, and furthermore, a microphone voice signal and a microphone voice signal GND are connected to each other through another conductor in the emergency communication system terminal apparatus and an interface of the microphone module.

Figure 5:
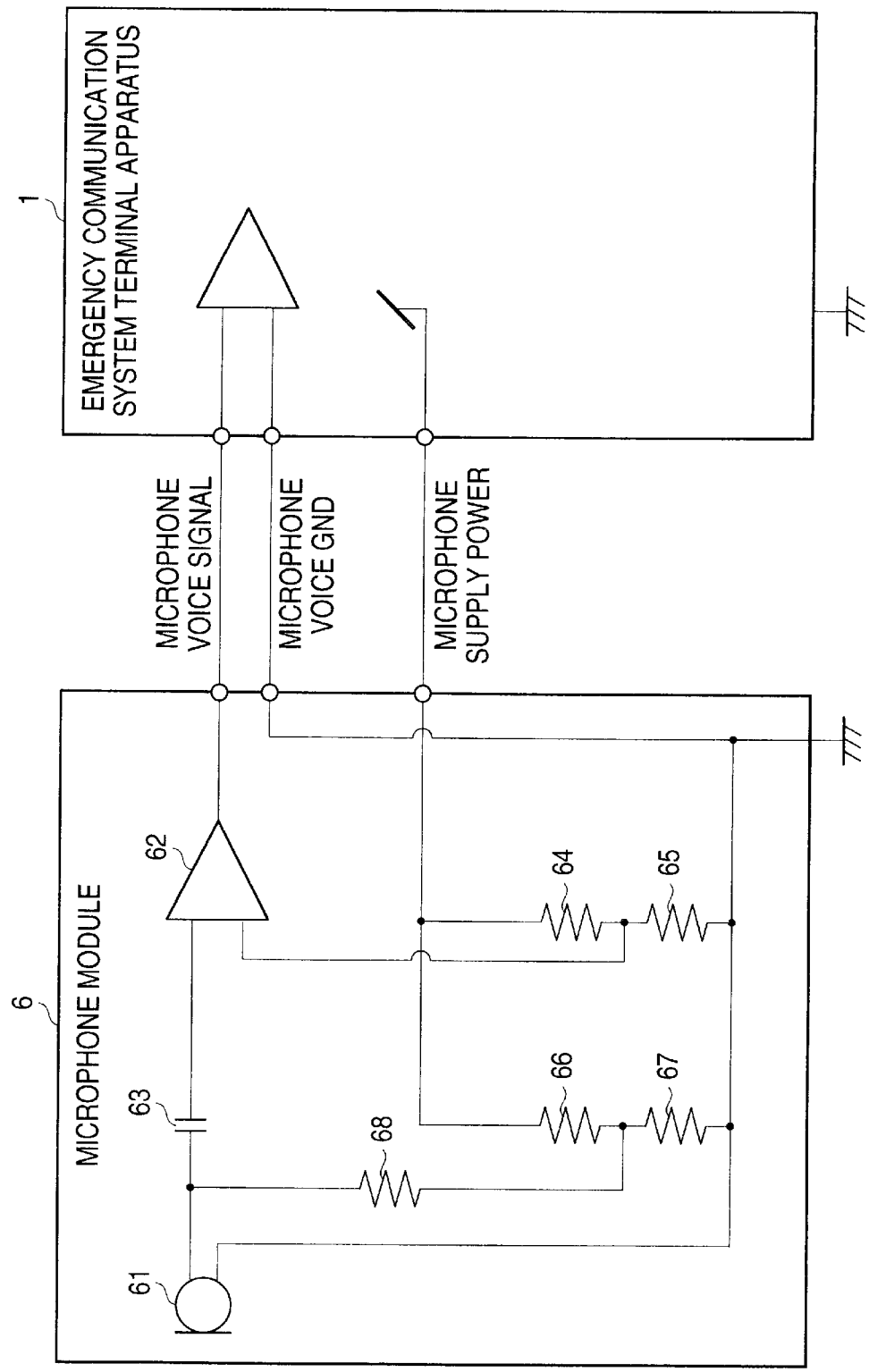
FIG. 5 is a block diagram showing the structures of an emergency communication system terminal apparatus and a microphone module according to a fourth embodiment of the invention.

FIG. 5 is a block diagram showing the structures of the emergency communication system terminal apparatus and the microphone module according to the fourth embodiment of the invention.

In FIG. 5, a microphone module 6 is the same as the microphone module 6 shown in FIG. 4 and is different from the microphone module of FIG. 4 in that a housing GND of a vehicle is used for the GND of the emergency communication system terminal apparatus 1 and the microphone module 6.

By using the housing GND of the vehicle for the power NGD provided between the emergency communication system terminal apparatus 1 and the microphone module 6, the conductors to be used for the GND can be reduced.

In the fourth embodiment of the invention, as described above, the power GND and the GND of the vehicle are shared. Consequently, it is possible to reduce the conductors between the microphone module 6 and the emergency communication system terminal apparatus 1.

(Fifth Embodiment)

A fifth embodiment of the invention provides such a structure that conductors dedicated to each of power supply and a power GND are provided, and furthermore, a microphone voice signal and a microphone signal GND are connected through a common conductor in the emergency communication system terminal apparatus and an interface of a microphone module.

Figure 6:
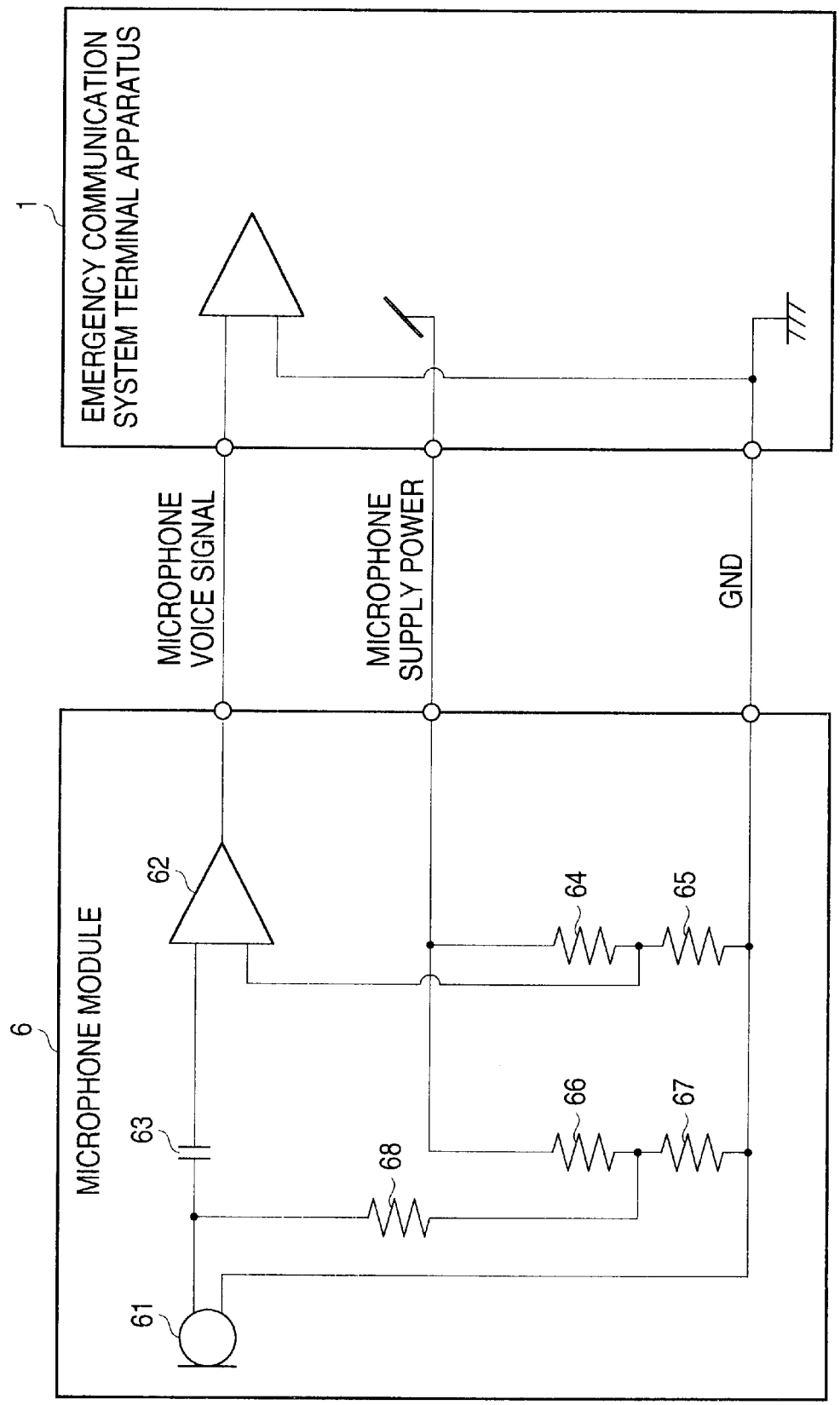
FIG. 6 is a block diagram showing the structures of an emergency communication system terminal apparatus and a microphone module according to a fifth embodiment of the invention.

FIG. 6 is a block diagram showing the structures of the emergency communication system terminal apparatus and the microphone module according to the fifth embodiment of the invention.

In FIG. 6, a microphone module 6 is the same as the microphone module 6 shown in FIG. 5 and is different from the microphone module of FIG. 5 in that a microphone voice signal GND and a power GND are set to be a common signal line in an emergency communication system terminal apparatus 1.

By setting the microphone voice signal and the microphone power GND to be the common GND, it is possible to reduce the conductors connecting the microphone module 6 and the emergency communication system terminal apparatus 1.

In the fifth embodiment according to the invention, as described above, the microphone voice GND and the microphone power GND are shared. Consequently, it is possible to reduce the conductors between the microphone module 6 and the emergency communication system terminal apparatus 1.

(Sixth Embodiment)

A sixth embodiment of the invention provides such a structure that conductors for power supply and a power GND are provided and a voice signal is synthesized and transmitted to the power GND in the emergency communication system terminal apparatus and an interface of a microphone module.

Figure 7:
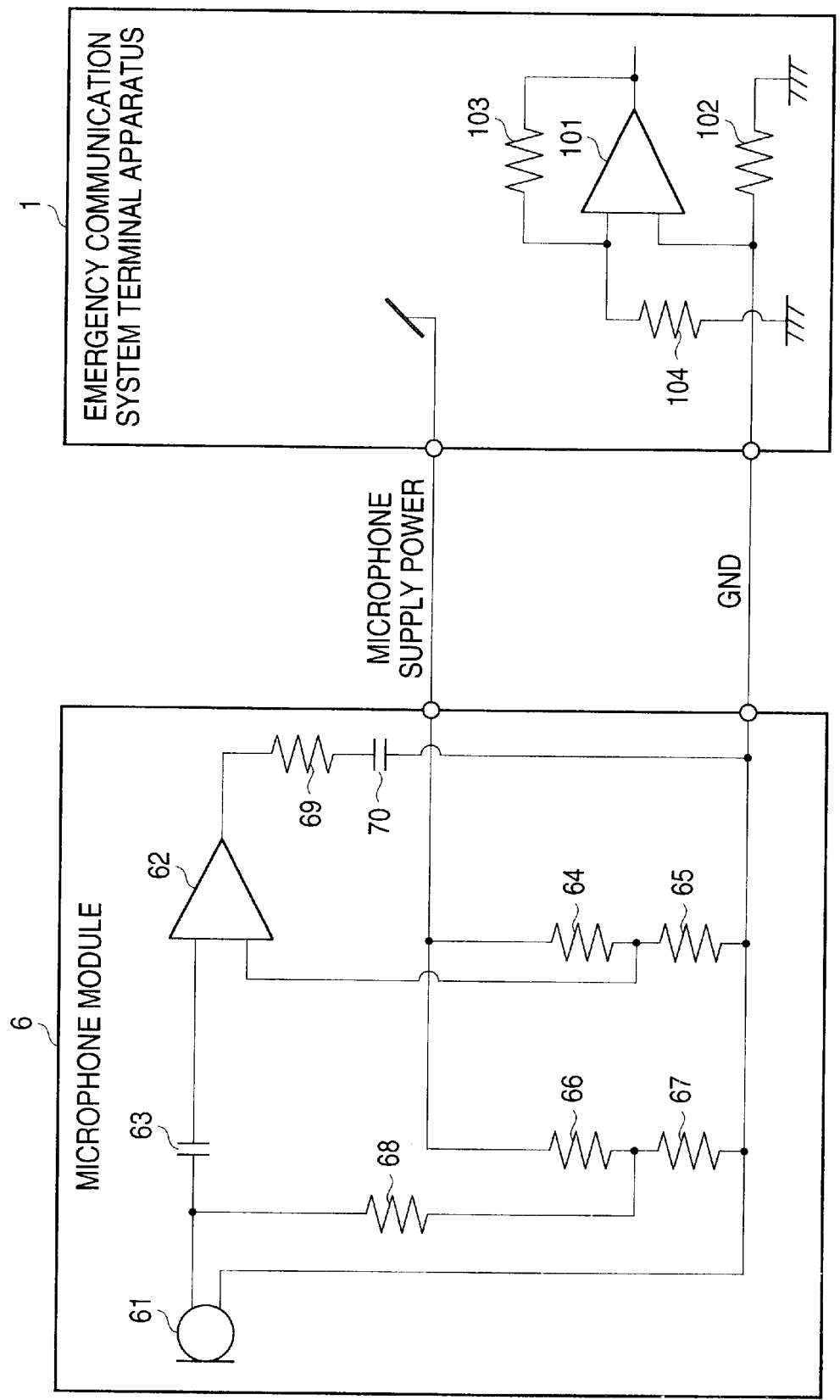
FIG. 7 is a block diagram showing the structures of an emergency communication system terminal apparatus and a microphone module according to a sixth embodiment of the invention.

FIG. 7 is a block diagram showing the structures of the emergency communication system terminal apparatus and the microphone module according to the sixth embodiment of the invention.

In FIG. 7, a microphone module 6 is the same as the microphone module shown in FIG. 6 and is different from the microphone module 6 of FIG. 6 in that a microphone voice signal is deleted from the microphone module 6 and the microphone module 6 is connected to a microphone GND signal through a resistor R6 (69) and a second capacitor 70.

A DC component of a transmission voice signal generated by a first operational amplifier 62 is removed by the second capacitor 70 and only an AC component is output to the GND. In the emergency communication system terminal apparatus 1, the signal is connected to the GND through a resistor R7 (102). Therefore, the voice signal is input to a second operational amplifier 101 and can be acquired as the transmission voice signal By using a resistor having a value of approximately 2.2 Ω for the resistor R7 (102), power can be supplied to the microphone module 6.

In the sixth embodiment of the invention, as described above, a power supply path and a microphone voice transmission path are shared so that the conductors can further be reduced.

INDUSTRIALLY APPLICABLE FIELD

As is apparent from the above description, according to the invention, an emergency communication system terminal apparatus comprises means for implementing hands-free voice talking when giving an emergency communication by inputting a voice signal from a microphone module, means for generating power to be supplied to the microphone module through power supplied from a main battery provided in a vehicle, and means for switching power supply to the microphone module to generation from power supplied from an auxiliary battery when power supply is interrupted by a failure of the main battery. In information transmission through the voice talking of an emergency message communicating process, therefore, in the case in which the supply of power is interrupted by the failure of the main battery provided in the vehicle, an operation is maintained by the supply of power from the auxiliary battery and power is generated by the supply of power from the auxiliary battery also in the supply of power to the microphone module. Consequently, it is possible to obtain an advantage that information transmission through the voice talking can be maintained also in the case in which an operation cannot be freely carried out due to accidents.

Moreover, each of a source voltage to be supplied to a microphone provided in the microphone module and a reference signal voltage is generated by a separate voltage reducing circuit. Therefore, it is possible to obtain an advantage that a voice talking operation can be continued also in the case in which the supply of power from the main battery is interrupted and that tone quality can be prevented from being deteriorated by inhibiting the reference signal from being influenced by a fluctuation in power supply relative to a voice to be input to the microphone by the separation of the power supply voltage to the microphone from the voice reference signal voltage.

Furthermore, conductors dedicated to power supply from the emergency communication system terminal apparatus to the microphone module and a power GND are provided and other conductors are further provided for a microphone voice signal and a microphone voice signal GND. Also in the case in which the supply of power from the main battery is interrupted, therefore, the voice talking operation can be continued and the voice signal can be input differentially in the emergency communication system terminal apparatus. Consequently, it is possible to obtain an advantage that a noise interference is caused with difficulty and tone quality can be prevented from being deteriorated.

Moreover, a conductor dedicated to power supply from the emergency communication system terminal apparatus to the microphone module is provided, a vehicle housing is used for a power GND, and other conductors are further provided for a microphone voice signal and a microphone voice signal GND. Therefore, it is possible to obtain an advantage that the voice talking operation can be continued also in the case in which the supply of power from the main battery is interrupted, and that the conductors between the microphone module and the emergency communication system terminal apparatus can be reduced by sharing the power GND and the GND of the vehicle.

Furthermore, conductors dedicated to power supply from the emergency communication system terminal apparatus to the microphone module and a microphone voice signal are provided, and a common conductor is provided for a power GND and a microphone voice signal GND. Therefore, it is possible to obtain an advantage that the voice talking operation can be continued also in the case in which the supply of power from the main battery is interrupted and that the conductors between the microphone module and the emergency communication system terminal apparatus can be reduced by sharing the power GND and the GND of the microphone module.

Moreover, conductors dedicated to power supply from the emergency communication system terminal apparatus to the microphone module and a power GND are provided, and a voice signal is synthesized and transmitted to the power GND. Therefore, the voice talking operation can be continued also in the case in which the supply of power from the main battery is interrupted, and a power supply path and a microphone voice transmitting path can be shared. Consequently, it is possible to obtain an advantage that the conductors can further be reduced.

What is claimed is:

1. An emergency communication system terminal apparatus comprising:
    means for implementing hands-free voice talking when giving an emergency communication by inputting a voice signal from a microphone module;
    means for generating power to be supplied to the microphone module through power supplied from a main battery provided in a vehicle; and
    means for switching power supply to the microphone module to generation from power supplied from an auxiliary battery when power supply is interrupted by a failure of the main battery,
    wherein each of a supply source voltage to be supplied to a microphone provided in the microphone module and a reference voice signal voltage to be a reference value of a voice signal is generated by a separate voltage reducing circuit.

2. The emergency communication system terminal apparatus according to claim 1, wherein conductors dedicated to power supply to the microphone module and a power GND are provided and other conductors are further provided for a microphone voice signal and a microphone voice signal GND.

3. The emergency communication system terminal apparatus according to claim 1, wherein a conductor dedicated to power supply to the microphone module is provided, a vehicle housing is used for a power GND, and other conductors are further provided for a microphone voice signal and a microphone voice signal GND.

4. The emergency communication system terminal apparatus according to claim 1, wherein conductors dedicated to power supply to the microphone module and a microphone voice signal are provided, and a common conductor is provided for a power GND and a microphone voice signal GND.

5. The emergency communication system terminal apparatus according to claim 1, wherein conductors dedicated to power supply to the microphone module and a power GND are provided, and a voice signal is synthesized and transmitted to the power GND.

6. An emergency communication system comprising the emergency communication system terminal apparatus according to any of claims 1 to 5 and an emergency communication center for generalizing a whole system and receiving an emergency communication transmission signal from the emergency communication system terminal apparatus.

7. The emergency communication system terminal apparatus according to claim 1, wherein means for switching power supply comprises a power controller that turns ON a first switch to supply power from the auxiliary battery to the emergency communication system and turns ON a second switch to supply power from the auxiliary battery to the microphone module when power supply is interrupted by a failure of the main battery.

* * * * *